(12) United States Patent
Crow et al.

(10) Patent No.: US 8,434,354 B2
(45) Date of Patent: May 7, 2013

(54) APPARATUS AND METHOD FOR A WIRELESS SENSOR TO MONITOR BARRIER SYSTEM INTEGRITY

(75) Inventors: Walter Crow, Katy, TX (US); Kevin Dodds, Houston, TX (US); Walter C. Riese, Katy, TX (US); Chester Little, Houston, TX (US)

(73) Assignee: BP Corporation North America Inc., Houston, TX (US)

(*) Notice: Subject to any disclaimer, the term of this patent is extended or adjusted under 35 U.S.C. 154(b) by 472 days.

(21) Appl. No.: 12/399,061

(22) Filed: Mar. 6, 2009

(65) Prior Publication Data

US 2010/0223988 A1    Sep. 9, 2010

(51) Int. Cl.
*E21B 49/00* (2006.01)
(52) U.S. Cl.
USPC ............... 73/152.04; 73/152.05; 73/152.16
(58) Field of Classification Search ............. 73/152.04
See application file for complete search history.

(56) References Cited

U.S. PATENT DOCUMENTS

| | | | |
|---|---|---|---|
| 6,028,534 A | 2/2000 | Ciglenec et al. | |
| 6,408,943 B1* | 6/2002 | Schultz et al. | 166/285 |
| 6,434,372 B1 | 8/2002 | Neagley et al. | |
| 6,693,553 B1 | 2/2004 | Ciglenec et al. | |
| 6,766,141 B1 | 7/2004 | Briles et al. | |
| 6,766,854 B2 | 7/2004 | Ciglenec et al. | |
| 6,840,114 B2 | 1/2005 | Niezgorski et al. | |
| 7,100,689 B2 | 9/2006 | Williams et al. | |
| 7,346,455 B2 | 3/2008 | Ward et al. | |
| 2005/0011645 A1* | 1/2005 | Aronstam et al. | 166/250.11 |
| 2006/0175125 A1* | 8/2006 | West et al. | 181/122 |
| 2007/0068673 A1 | 3/2007 | Daily | |
| 2008/0106972 A1* | 5/2008 | Liang et al. | 367/25 |
| 2008/0112760 A1* | 5/2008 | Curlett | 405/55 |
| 2008/0211687 A1 | 9/2008 | Price et al. | |
| 2008/0236837 A1 | 10/2008 | Lovell et al. | |
| 2008/0239872 A1 | 10/2008 | Miller et al. | |
| 2009/0007651 A1 | 1/2009 | Ramakrishan et al. | |

FOREIGN PATENT DOCUMENTS

| | | |
|---|---|---|
| EP | 1 662 673 | 5/2006 |
| EP | 1 662 673 A1 * | 5/2006 |
| EP | 1662673 A1 * | 5/2006 |
| WO | 0165066 | 9/2001 |
| WO | WO 01/65066 * | 9/2001 |
| WO | WO 01/65066 A1 * | 9/2001 |
| WO | WO 2006/000555 A2 | 1/2006 |

OTHER PUBLICATIONS

Inficomm-Reflective Wireless Communications System, Licensible Technologies, Los Alamos National Laboratories, Sep. 2006.
Inficomm-Military Technology Performs "Well" for Chevron, Seeing the unseen, p. 9 only.

* cited by examiner

*Primary Examiner* — John Fitzgerald
*Assistant Examiner* — Gregory J Redmann
(74) *Attorney, Agent, or Firm* — John L. Wood

(57) ABSTRACT

This invention describes an apparatus and a method for integrity monitoring of a borehole and the seal integrity of a caprock suitable for sequestration of greenhouse gases. The apparatus includes plural neutrally buoyant sensors for placement outside of a casing, placement including distribution within at least mud filter cake, cement, and proppant. This invention also includes a method for monitoring integrity of a borehole suitable for sequestration of greenhouse gases or other types of well using the described apparatus.

11 Claims, 5 Drawing Sheets

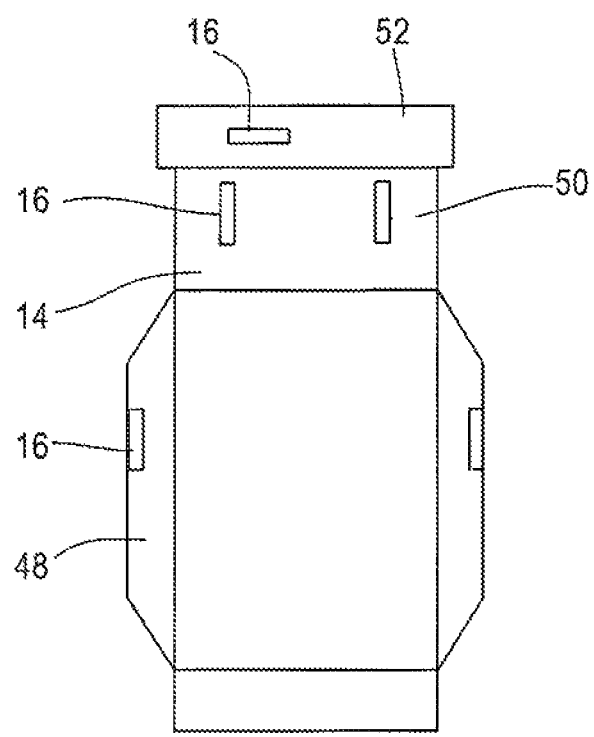

APPARATUS AND METHOD FOR A WIRELESS SENSOR TO MONITOR BARRIER SYSTEM INTEGRITY

BACKGROUND

1. Technical Field

This invention relates to an apparatus and a method for a wireless sensor to monitor barrier system integrity, such as used or employed during sequestration of greenhouse gases.

2. Discussion of Related Art

Recent concerns regarding the environment and global warming are creating a desire and a need for sustainable energy programs while reducing emissions. Global warming may be linked to greenhouse gases. Greenhouse gases broadly include gases in an atmosphere that absorb and emit radiation within the thermal infrared range, such as carbon dioxide, methane, hydrogen sulfide, nitrous oxide, ozone, chlorofluorocarbons (CFCs), and/or the like. Power plants and other energy conversion facilities tend to be large sources of greenhouses gases emitted to the atmosphere.

Several possible solutions and alternatives are being proposed or developed to mitigate or reverse global warming. Carbon capture and storage or sequestration seeks to reduce emissions, such as by placing the carbon dioxide or other greenhouse gases into geological formations. Suitable geological formations generally have an overlying caprock of low permeability that may trap greenhouse gases and prevent them from migrating to underground sources of drinking water, the surface, and/or the atmosphere. Well designed sequestration systems maintain the seal integrity of the engineered borehole and the adjacent natural caprock seal even after the injection has stopped.

Injection of liquid waste into suitable geologic formations has been practiced for many years, such as hazardous waste disposed at deep well injection facilities. Deep wells inject the liquid waste into layers below impervious rock or clay.

Ciglenec et al., U.S. Pat. No. 6,766,854, discloses a wellbore sensor apparatus and method where the apparatus includes a downhole tool carrying at least one sensor plug for deployment into the sidewall of a wellbore. The apparatus is also used in conjunction with a surface control unit and a communication link for operatively coupling the sensor plug to the surface control unit. The sensor plug collects wellbore data, such as pressure or temperature of a hydrocarbon production formation, and communicates the data uphole via a communication link, such as the downhole tool or an antenna. Ciglenec et al. does not teach or suggest sensors for monitoring greenhouse gas sequestration systems. The entire teachings of Ciglenec et al., U.S. Pat. No. 6,766,854, are herein incorporated by reference in their entirety.

Schultz et al., U.S. Pat. No. 6,408,943, discloses a method and apparatus for placing and interrogating downhole sensors to passively monitor cement integrity within a wellbore in the hydrocarbon production interval. The sensors are "pumped" into place by placing them into a suspension in the cement slurry at the time a well casing is being cemented. The sensors are either battery operated, or of a type where external excitation may be applied to power and operate the sensor, which will send a signal conveying the desired information. The sensor is then energized and interrogated using a separate piece of wellbore-deployed equipment whenever it is desired to monitor cement conditions. Schultz et al. does not teach or suggest sensors for monitoring greenhouse gas sequestration systems. The entire teachings of Schultz et al., U.S. Pat. No. 6,408,943, are herein incorporated by reference in their entirety.

Negaley et al., U.S. Pat. No. 6,434,372, discloses a long-range communications apparatus utilizing modulated-reflector technology. The apparatus includes an energy-transmitting base station and remote units that do not emit radiation in order to communicate with the base station since modulated-reflector technology is used whereby information is attached to an RF carrier wave originating from the base station which is reflected by the remote unit back to the base station. Since the remote unit does not emit radiation, only a low-power power source is required for its operation. Information from the base station is transmitted to the remote unit using a transmitter and receiver, respectively. The range of such a communications system is determined by the properties of a modulated-reflector half-duplex link. The entire teachings of Negaley et al., U.S. Pat. No. 6,434,372, are herein incorporated by reference in their entirety.

Vinegar et al., International Patent Application Publication WO 01/65066, discloses a petroleum well having a borehole extending into a formation. A piping structure is positioned within the borehole, and an induction choke is positioned around the piping structure downhole. A communication system is provided along the piping structure between a surface of the well and the induction choke. A downhole module is positioned on an exterior surface of the piping structure and is configured to measure characteristics of the formation. The formation characteristics, such as pressure and resistivity, are communicated to the surface of the well along the piping structure. The entire teachings of Vinegar et al., International Patent Application Publication WO 01/65066, are herein incorporated by reference in their entirety.

There is a need and a desire to monitor barrier system integrity of greenhouse gas sequestration systems and/or other systems or wells. There is also a need and a desire for a sensor located outside of a casing of a borehole to detect changes in the surroundings and communicate with devices within the casing. There is also a need and a desire for a sensor to monitor barrier system integrity over long durations or spans of time associated with greenhouse gas sequestration. There is also a need and a desire for a sensor that can detect or measure characteristics not available with other wireless sensors deployed outside the casing, such as pH, porosity, conductivity, resistivity, the presence of or migration of carbon dioxide, hydrocarbon liquid, hydrocarbon gas, other geomechanical conditions, and/or the like. There is also a need and a desire for sensors that can be installed simply and cost effectively during drilling or in an existing well.

SUMMARY

This invention relates to an apparatus and a method for a wireless sensor to monitor barrier system integrity, such as used or employed during sequestration of greenhouse gases. The apparatus and the method monitor barrier system integrity of greenhouse gas or carbon sequestration systems, such as the engineered borehole and/or the natural caprock formation. The apparatus and the method may also be used with other systems or wells. This invention also relates to sensors located outside of a casing of a borehole to detect changes in the surroundings and communicate with devices within the casing. The sensors operate to monitor barrier system integrity over long durations or spans of time (years, decades, and even centuries) associated with greenhouse gas sequestration. The sensors can detect or measure characteristics not available with other wireless sensors deployed outside the casing, such as pH, porosity, conductivity, resistivity, the presence of or migration of carbon dioxide, hydrocarbon liquid, hydrocarbon gas, other geomechanical conditions, and/or the like.

The sensors can be installed simply and cost effectively during drilling or in an existing well.

According to one embodiment, this invention relates an apparatus for integrity monitoring of an engineered borehole and the seal integrity of a caprock suitable for sequestration of greenhouse gases. The apparatus includes one or more sensors for placement outside of a casing to monitor such a borehole, and a tool that may move within the casing to power and interrogate the one or more sensors. The sensors may also be powered and interrogated from surface.

According to a second embodiment, this invention relates to a method for monitoring integrity of an engineered borehole located through the natural caprock seal that is suitable for sequestration of greenhouse gases. The method includes the step of disposing one or more sensors outside a casing and the step of powering the one or more sensors with a tool inside the casing. The method also includes the step of interrogating the one or more sensors with the tool to monitor a borehole. In the alternative, the sensors may also be powered and interrogated from surface.

According to a third embodiment, this invention relates to a method of sequestration of greenhouse gases. The method includes the step of drilling an engineered borehole and the step of disposing one or more sensors with respect to the borehole. The method also includes the step of casing the borehole with the one or more sensors outside a casing and the step of injecting a greenhouse gas into or through the borehole, such as into a storage formation. The method also includes monitoring the integrity of the borehole by powering and interrogating the one or more sensors with a tool movable inside the casing.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention. In the drawings:

FIG. 6 illustrates a casing with a casing centralizer, according to one embodiment.

DETAILED DESCRIPTION

Figure 1:
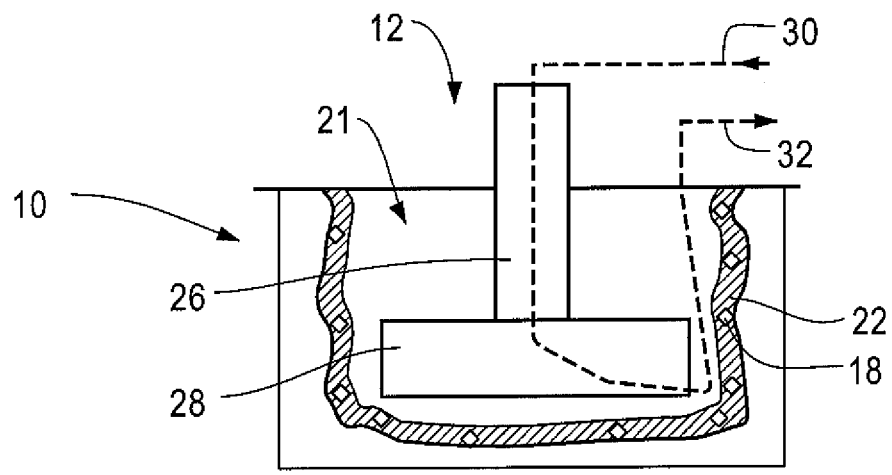
FIG. 1 illustrates drilling a surface borehole including sensors in the mud filter cake, according to one embodiment.

This invention may include an apparatus and a method for a wireless sensor to monitor barrier system integrity, such as used or employed during sequestration of greenhouse gases.

According to one embodiment, this invention may include a sensor that detects the pH, other geochemical conditions, presence or migration of molecules in or along the cement barrier for the production, injection or monitoring life of a borehole. The engineered borehole includes the borehole created during drilling, the mud filter cake that remains along or around the borehole, the casing or pipe that supports the borehole, the centralizer which supports the casing, the cement or other suitable material that fills the space between the casing and the borehole, any other associated equipment or material, and/or the like. Desirably, the engineered borehole or the components thereof form or make a barrier system within the natural caprock seal and/or other portions of the sequestration system. The sensors of this invention may be used or installed with new wells or boreholes, such as during mud circulation, filter cake formation, casing location, cement placement, and/or the like. The sensors of this invention may be used or installed with existing wells or boreholes, such as by insertion of sensors outside or through the existing casing.

Desirably, but not necessarily, the sensor includes a relatively small device encapsulated in a protective housing, such as to permit injection into the circulation system during drilling, adding proppant, cementing, and/or the like. Circulation or flow permits sensor placement along the borehole wall (mud displacement), in the cement barrier, in the proppant, and/or the like.

In the alternative, a sensor may be deployed or inserted by creating or making a hole or aperture through a casing and/or cement liner of a completed or existing well or borehole. Desirably, the insertion hole can be closed or plugged following sensor placement.

The sensor could have internal power (active) and/or power could be provided from an external source (passive and/or parasitic). Any suitable internal power supply or source may be used, such as dry cell batteries, wet cell batteries, lithium ion batteries, nickel metal hydride batteries, fuel cells, other sources of electrical potential, other sources of chemical potential, and/or the like. Desirably, the internal power source has a useful life corresponding to the duration for which sensor readings will be taken. Multiple and/or redundant power supplies are within the scope of this invention. Combinations of active and passive systems are also within the scope of this invention, such as an external signal initializes a sensor to perform a scan or take a reading using an internal power source. The reading can be transmitted from the sensor and then the sensor powered down or turned off to conserve power or resources.

Any suitable external power supply or source may be used, such as acoustic energy, ultrasonic energy, thermal energy, electromagnetic energy, x-rays, microwaves, hydraulic (flowing fluid) energy, and/or the like. The source of external power may be from a logging tool, a smart pig, and/or the like from within the casing. Parasitic power systems may include piezoelectric systems. In the alternative, the power supply may include electricity, such as through a wire or other suitable conductor which may include the casing or liner. Externally powered systems or sensors may allow for long useful life of the sensors, such as the many years needed for monitoring greenhouse gas sequestration systems.

Desirably, but not necessarily, the sensor does not require memory to store data. The sensor can be interrogated and/or queried by an external source, such as a wireline logging device or other downhole tool. The wireline tools can create electric fields, magnetic fields, acoustic fields, and/or the like to provide energy to excite the sensor.

The wireline tool may be at any suitable distance from the sensor to the center of the wellbore, such as between about 5 centimeters and about 1,000 centimeters, between about 10 centimeters and about 100 centimeters, between about 20 centimeters and about 50 centimeters, about 25 centimeters, and/or the like.

In the alternative, the sensor includes a suitable amount of memory, such as to store data or readings for a suitable amount of time or between interrogations with a wireline log. Any suitable amount of memory is possible, such as at least about 1 kilobyte, at least about 1 megabyte, at least about 1 gigabyte, and/or the like. Flash memory may be used to store readings while the sensor is powered down before and/or between interrogations.

When the sensor has been energized, the sensor can detect a property of the barrier system, such as pH, porosity, conductivity, resistivity, certain molecules that can characterize the environment that surrounds it and/or migration through it, and/or the like. A measurement of the environment from the sensor response would be detected on a tool near the sensor, such as while providing energy and/or a signal to activate the sensor. The interrogation step may include any suitable communication between the sensor and the logging tool and vice versa, such as sending a signal from the logging tool to power and activate the sensor, sending a signal from the sensor to the logging tool, and/or the like.

Desirably, the downhole wireline logging tool may provide power and the ability to detect, record, and/or transmit the sensor measurement response to its environment. Additionally and optionally, the logging tool may detect and/or record a location of the sensor, such as depth, azimuth (angular location), distance, and/or the like. Desirably, the logging tool may identify individual sensors, such as by a unique tag or field of information. The use of radio frequency identification (RFID) is within the scope of this invention.

Trending or tracking individual sensor responses over time may provide proactive and/or predictive measurement of the integrity of the engineered borehole and/or the natural caprock seal, such as showing a change in pH or evidence of fluid migration at one location over time. Additionally and/or optionally, trending or tracking multiple sensor responses over time can provide proactive and/or predictive measurement of the integrity of the engineered borehole and/or the natural caprock seal, such as showing a change in pH or evidence of fluid migration along a distance over time.

Information on the geochemical environment or geomechanical environment outside of the casing wall can provide an assessment of key indicators of the condition of the barrier system including corrosive attack and/or gas channeling or leakage. Without being bound by theory, one of the most likely failure mechanisms for a storage or sequestration system is believed to be at, along, or near the borehole used for injection, since it is near the injection point and leads back to the surface. The cement attempts to replace the natural seal or formation that was disturbed when the borehole was drilled through the caprock. Cement interfaces with the casing and the formation can be the most likely potential migration pathways along the engineered borehole.

The sensors of this invention desirably monitor or detect changes in the area surrounding the engineered borehole, in the natural caprock seal, in the reservoir, and/or the like. Desirably, the sensors can also detect changes in the environment at the cement interfaces with the casing, the mud filer cake interfaces, the borehole wall interfaces, and/or the like. The sensors of this invention seek to particularly monitor conditions and/or changes in this area as well as other parts of the overall system.

According to one embodiment, this invention relates to a wireless sensor to interrogate the pH, presence of hydrocarbon gas, presence of carbon dioxide, and/or the like. The sensor outside the casing could provide a way to measure changes in well integrity due to exposure to downhole conditions, such as an acidic environment. The system can be composed of two parts including the sensor and a logging tool to provide energy in the form of electric, magnetic, and/or acoustic energy. The sensor may include geochemical or molecular measurement of materials present along and/or surrounding the barrier system from the outside casing wall to the area in the borehole wall including cement, proppant, and/or remnant mud filter cake. In the alternative, the sensor may detect properties and/or changes within the reservoir, beyond the wellbore wall, into the surrounding rock, and/or the like. As used herein mud filter cake may sometimes be referred also as mudcake, and/or filter cake. The wireline logging tool and/or surface control can generate an appropriate energy to power the sensor in the wellbore environment. Desirably, the system can provide a time lapse technique to compare conditions over the course of years by periodic logging.

Logging of the borehole and interrogation of the sensors may be done at any suitable frequency, such as about at least hourly, about at least daily, about at least weekly, about at least monthly, about at least every two months, about at least every six months, about at least annually, about at least every two years, about at least every five years, about at least every ten years, and/or the like. In the alternative, the sensors may provide continuous monitoring or readings on a continuous basis, a semi-continuous basis, a discrete basis, and/or the like.

FIG. 1 illustrates a surface section of an engineered borehole 12 with mud filter cake sensors 18 for a greenhouse gas sequestration system during installation of a new wellbore, according to one embodiment. The borehole 12 includes a drill string 26, a drill bit 28, and a mud filter cake 22. The borehole 12 also contains or holds an apparatus 10 and the mud filter cake sensors 18. The mud filter cake sensors 18 may be circulated, or flow with the drilling mud 21 in the mud flow path or mud inlet 30, travel down the drill string 26, and past the drill bit 28. The drilling mud 21 then forms the mud filter cake 22 before some drilling mud 21 exits the mud outlet 32. Some of the sensors become embedded in the mud filter cake 22 and/or in the dirt or rock of the borehole wall. Any sensors that exit with the drilling mud 21 may be captured and reused.

Figure 2:
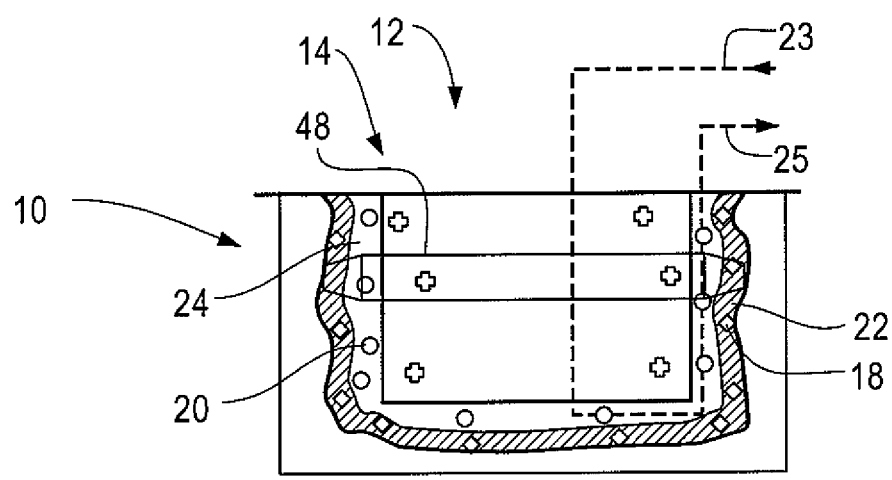
FIG. 2 illustrates a casing set in the surface borehole with cement circulated to place additional sensors, according to one embodiment.

FIG. 2 illustrates a casing disposed in the surface borehole, cement 24, centralizer 48, and cement sensors 20, according to one embodiment. The apparatus 10 includes the mud filter cake 22, mud filter cake sensors 18, and cement sensors 20. The cement sensors 20 may be circulated with the cement 24 in the cement inlet 23 down the casing 14 and exit the cement outlet 25 at the annular space between the borehole 12 and the casing 14.

Figure 3:
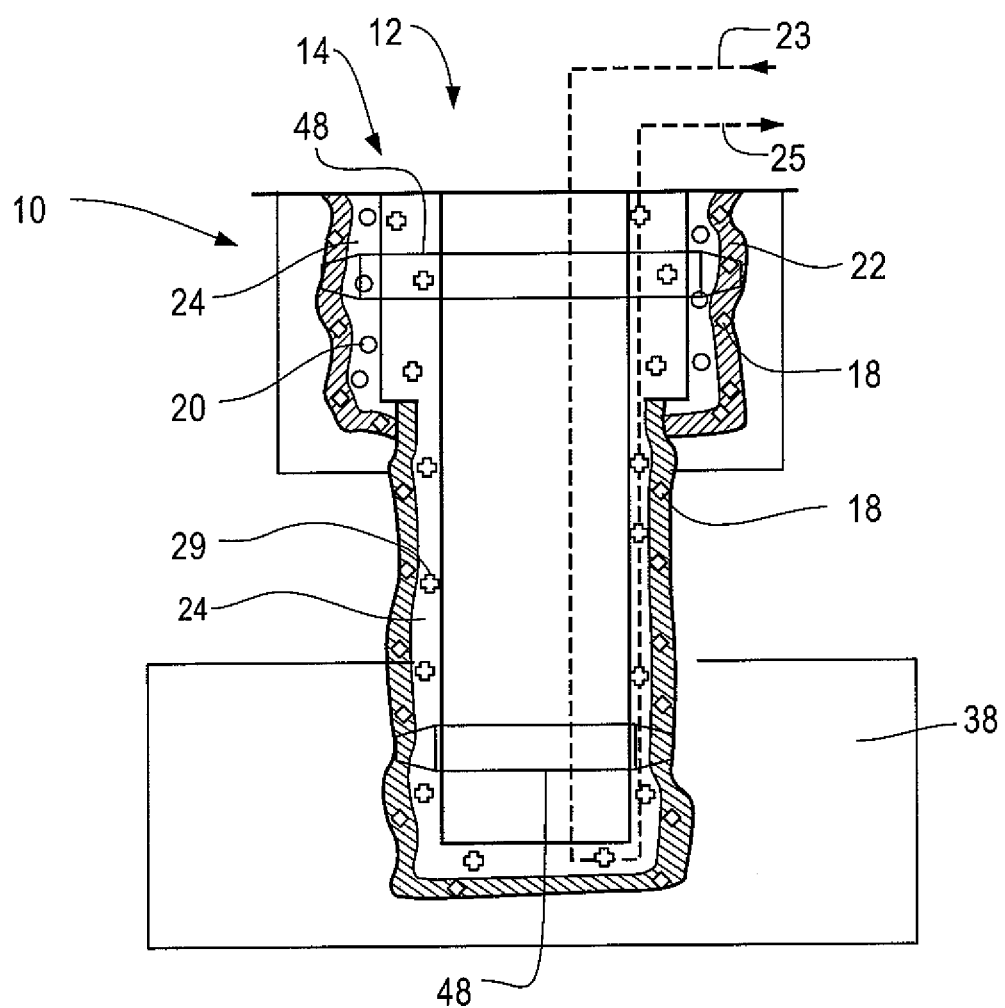
FIG. 3 illustrates a casing set in an intermediate borehole with sensors disposed in the mud filter cake and in the cement, according to one embodiment.

FIG. 3 illustrates a casing 14 in a caprock 38 of an engineered borehole 12, such as in an intermediate casing and according to one embodiment. The apparatus 10 includes a mud filter cake 22, mud filter cake sensors 18, cement 24, cement sensors 20, cement sensors 29 for the intermediate casing, cement inlet 23, cement outlet 25, and centralizers 48.

Figure 4:
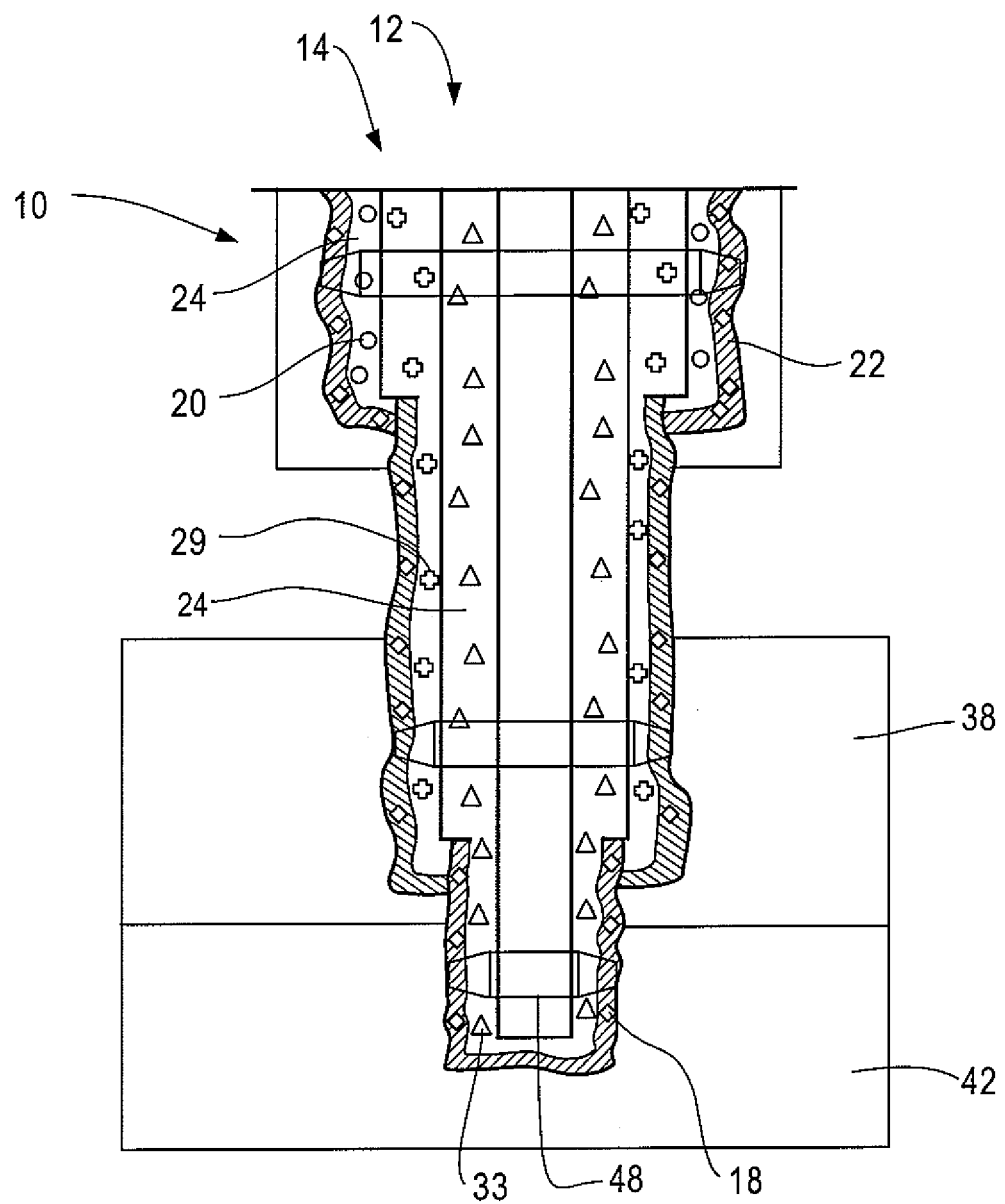
FIG. 4 illustrates an injection casing set in an engineered borehole through an injection formation with sensors disposed in the mud filter cake and in the cement, according to one embodiment.

FIG. 4 illustrates the casing 14 in a formation 42 of an engineered borehole 12 through the caprock 38, such as with an injection casing and according to one embodiment. The apparatus 10 includes a mud filter cake 22, mud filter cake sensors 18, cement 24, cement sensors 20, cement sensors 29, cement sensors 33 for the injection casing, and centralizers 48.

Figure 5:
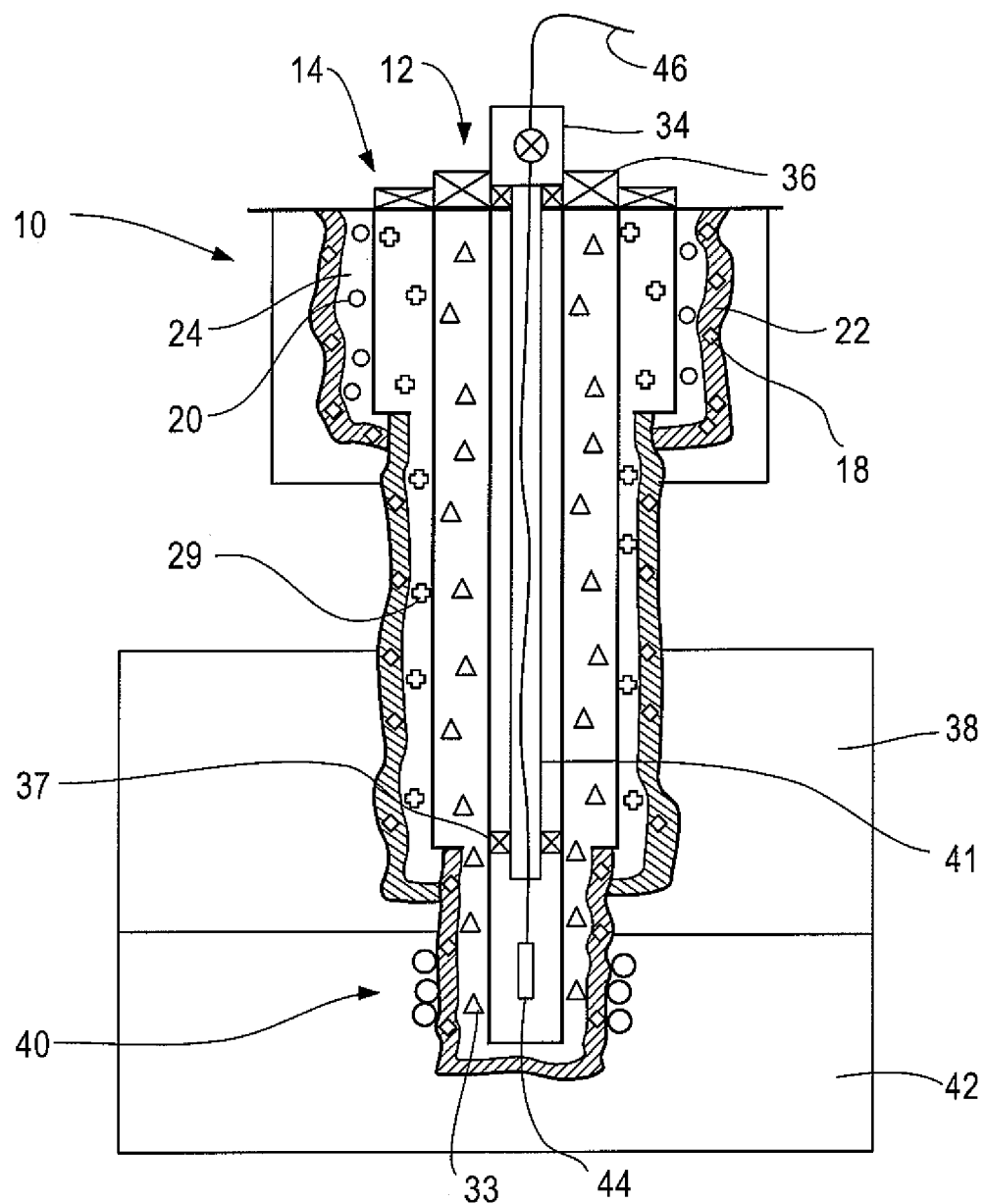
FIG. 5 illustrates the engineered borehole with sensors and a wireline logging tool, according to one embodiment.

FIG. 5 illustrates the engineered borehole 12 with the sensors 18, 20, 29 and 33 of FIG. 4 installed and using a wireline tool 44, according to one embodiment. The engineered borehole 12 includes the casing 14, mud filter cake 22, cement 24, and the apparatus 10, as described with respect to the prior figures. The engineered borehole 12 also includes a well head 34 with seals 36, a packer 37, and an injection tubing 41. The engineered borehole 12 also includes proppant 40 disposed in a portion of the reservoir or formation 42. The formation 42 is located beneath the caprock 38. A wireline 46 provides movement, communication, and/or power to the wireline tool 44. The wireline tool 44 powers and/or interrogates the sensors 18, 20, 29 and 33, such as while moving down or up the completed and equipped borehole 12.

FIG. 6 illustrates a casing 14 that could be used in an engineered borehole (not shown) for a greenhouse gas sequestration system, according to one embodiment. The casing 14 has a centralizer 48 (also shown in FIGS. 2, 3, and 4) disposed about a length of pipe and a collar 52 disposed as an integral part on one end. Centralizers can support the casing off the borehole wall, such as to permit cement circulation around the casing. Sensors 16 mount to the centralizer 48, to the collar 52, and/or to the exterior of the casing as at 50. The sensors 16 may be rigidly attached to withstand installation and cementing of the casing (if performed).

According to one embodiment, this invention may include an apparatus for integrity monitoring of an engineered borehole or wellbore, and the seal integrity or containment performance of the naturally occurring caprock, which together are suitable for sequestration of greenhouse gases in an underlying geological formation. The apparatus may include one or more sensors for placement outside of a casing to monitor a borehole, and a tool for movement within the casing to power and interrogate the one or more sensors.

Integrity broadly refers to an unimpaired condition or soundness, such as the quality or state of being complete or undivided, such as a state which conforms fully to its engineering design intentions. Desirably, integrity for a sequestration system causes or allows containment without unintended leakage (significant leakage) or migration beyond the intended bounds or geologic formations, such as into groundwater sources (protection). In the alternative, some leakage, migration, diffusion, and/or the like into the caprock may be desirable.

Monitoring broadly refers to watching measuring, keeping track of, checking, and/or the like.

An engineered borehole broadly refers to any suitable hole bored or drilled in the Earth, such as a narrow shaft drilled in the ground, vertically, deviated, horizontally, and/or the like. Boreholes or engineered boreholes may also include the mud filter cake, casing, cement, drillstring, drill bit, and/or the like. Boreholes may be of any suitable length, such as at least about 100 meters, at least about 500 meters, at least about 1,000 meters, at least about 5,000 meters, and/or the like. Boreholes may include any suitable diameter or effective diameter, such as at least about 10 centimeters, at least about 25 centimeters, at least about 50 centimeters, at least about 100 centimeters, at least about 500 centimeters, and/or the like.

The diameter of the borehole may vary with length, such as starting at one diameter at the surface and reducing to a smaller diameter further below the surface, such as in a stepwise manner. The diameter may also include area of expanded diameter to increase the cement barrier thickness, for example. The diameter of the borehole may also depend on types of geologic formations, casing designs, and/or the like. In the alternative, the diameter may increase at depth by underreaming and/or the like. Increasing the diameter may provide extra thickness of cement or reduce hoop stresses in the formation, for example.

Sequestration broadly refers to setting apart, depositing, storing, segregating, and/or the like, such as away from contact or inclusion into the atmosphere or to the surface of the Earth. Atmosphere broadly refers to the gaseous material surrounding a planet, such as the Earth.

As discussed above, greenhouse gases broadly include gases or vapors in an atmosphere that absorb and emit radiation within the thermal infrared range, such as carbon dioxide, methane, hydrogen sulfide, nitrous oxide, ozone, chlorofluorocarbons (CFCs), and/or the like. Without being bound by theory, greenhouse gases are believed to receive and/or retain solar radiation or energy which becomes trapped in the atmosphere and causes an increase in the average global atmospheric temperatures.

Sensors broadly refer to any suitable device that can measure and/or respond to a physical stimulus or a change in surroundings. Desirably, the sensor can transmit a signal which describes and is unique to the characteristic measured. Sensors may measure or detect any suitable characteristics, such as, but not limited to, geomechanical properties, geochemical properties, porosity, permeability, conductivity, presence or migration of carbon dioxide or hydrocarbon(s), heat, temperature, electromagnetic radiation, radioactive particles, sound, acoustic forces, pressure, strain, magnetism, motion, direction, pH (including acidity, neutrality, and/or alkalinity), electrical resistance, electrical conductance, electrical impedance, motion, migration, flow, flow rate, molecular detection (presence including carbon dioxide and/or other hydrocarbons), and/or the like. Hydrocarbons may be present as a liquid and/or a gas (vapor). The sensors may measure or detect a single characteristic. In the alternative, the sensors may measure or detect multiple characteristics, such as in parallel and/or in series.

Deployment of the sensors down the engineered borehole may include single characteristic sensors, different types or combinations of single characteristic sensors, multiple characteristic sensors, and/or the like. Sensors for different characteristics may be deployed at different depths, in different geologic formations, and/or the like, such as to measure a pertinent or relevant characteristic or feature relative to the storage or sequestration of the greenhouse gasses.

The sensors desirably, but not necessarily, include a relatively compact and self contained unitary design, such as may be circulated with the drilling mud, proppant, and/or casing cement. The sensors may be small enough or strong enough for passing through circulating devices or pumps for distribution and emplacement. In the alternative, the sensors may be inserted or added into the downstream of the pump discharge, such as with a higher pressure liquid or gas with a same or different composition than the main flow.

The sensors may be of any suitable size and/or shape. The sensors may include a longest dimension of less than about 10 centimeters, less than about 5 centimeters, less than about 2 centimeters, less than about 1 centimeter, less than about 0.5 centimeters, and/or the like. The sensors may include nanotechnology and/or the use of motes (smart dust). The sensors may be of any shape including a generally spherical shape, a generally cube shape, and/or the like. The sensors may be of any suitable density (mass per volumetric displacement), such as may sink, float, and/or be neutrally buoyant with respect to a surrounding fluid. According to one embodiment, the sensors are neutrally buoyant with respect to drilling mud being circulated, with respect to cement being circulated, with respect to proppant being pumped, and/or the like.

According to one embodiment, the sensors may include a clock or other suitable timer capabilities, such as to periodically measure or detect the surroundings of the sensor. Embodiments with a clock feature may include some amount of memory storage, and/or an internal power supply. Clocks may have the sensors sample the surroundings at any suitable interval, such as about every second, about every minute, about every 10 minutes, about every 30 minutes, about every hour, about every 6 hours, about every day, about every other day, about every week, about every 2 weeks, about every month, about every 2 months, about every 6 months, about every year, about every 2 years, about every 5 years, about every 10 years, and/or the like.

In the alternative, the sensors may exclude clock capabilities, memory storage, and/or an internal power supply. Such basic sensors may be referred to as dumb sensors and the simplicity of dumb sensors may be particularly robust and reliable for years or decades of service in monitoring the sequestration system.

Sensors of this invention can be designed to function for the long durations needed to monitor sequestration systems which are in contrast to sensors used for measurement while drilling and/or during a relatively short production life of a well, such as when oil is extracted.

One or more sensors broadly include one sensor, multiple sensors, a plurality of sensors, and/or the like. Tens, hundreds, thousands, or more sensors can be deployed within a sequestration system.

Casing broadly refers to something that encases or encloses, such as metal pipe, fiberglass pipe, composite pipe, and/or the like used to case or isolate a well or hole from the surroundings. Casings may include any suitable size and/or shape. Casing may be inserted or installed into any suitable length of an engineered borehole, such as through an aquifer, and/or the like. Casings may be used in all or parts of the borehole. Casings within casings are within the scope of this invention. The annular space between casings may provide a leak detection point or may be pressurized to a level above that of the reservoir, such as any breach of the barrier system would be of the pressurization fluid inward.

Tool or wireline tool broadly refers to any suitable device and/or equipment for movement within the casing to power and/or interrogate the sensors. Desirably, the tool can travel at least a portion of the length of the wellbore or borehole, such as tethered to a line and controlled from the surface. In the alternative, the tool may be self contained and remotely controlled. The tool may send a signal or power source out to the sensors. The tool may also send signals to initiate and/or wake up the sensors, such as from a powered down state. The tool may also interrogate or question the senor for the current or past (prior) readings or measurements. Desirably, the tool includes the ability to determine location, depth, and/or angular direction (azimuth) of the sensors. The tool may include motive devices, such as to propel it along the wellbore. In the alternative, a fluid may be used to move the tool.

According to one embodiment, the tool interrogates the sensors while the tool passes or moves along the wellbore. In the alternative, the tool stops with respect to the sensor to interrogate it. The tool may use moving scans of the sensors to identify changes and then stop to further explore changed readings. The tool and the sensor desirably are not in physical (adjacent) contact with each other and/or the tool and the sensor are not in direct electrical contact with each other. The tool may further include additional functionality, such as ultrasonic thickness measurement of the casing, electrical resistivity, and/or the like. In the alternative a wire may provide direct connection between the sensor and casing inner diameter to permit power and/or interrogation by contact with a tool passing through the inside of the casing.

The configuration of the sensors disposed outside the casing and the tool movable within the casing can provide measuring or detecting changes outside the casing while the tool simply moves within the casing to provide a cost effective device to monitor borehole integrity.

According to one embodiment, the sensors can be disposed on a casing centralizer or an external casing attachment. A centralizer broadly refers to any suitable device designed to keep the casing in the center of the borehole and/or away from the borehole wall, such as a device fitted with a hinged collar and bowsprings. Other external casing attachments may be included on the outside of a piece of pipe used for the casing, on a threaded coupling between pieces of pipe, and/or the like.

According to one embodiment, the tool powers or sends power to one or more of the sensors with acoustic energy, radio frequency energy, electrical induction, and/or the like. The tool may power more than one sensor at a time, such as all sensors in a proximate region and/or direction.

According to one embodiment, the tool interrogates the one or more sensors with a radio frequency signal and the one or more sensors transmit a radio frequency signal, an acoustic signal feedback, and/or the like back to the tool. Interrogation desirably includes a two way exchange of data or information. In the alternative, interrogation includes a one way data flow.

According to one embodiment, the tool may include capabilities to determine a depth and an azimuth of the one or more sensors with respect to the borehole. The tool may be able to determine a distance from the center of the borehole to the sensor as well as determine the type of media surrounding the sensor, such as dirt, rock, mud filter cake, proppant, cement, and/or the like.

The sensors may be disposed or located in any suitable location and/or media, such as near the surface, at mid-depth, at full depth, and/or the like. The sensors may be disposed or located in or near a mud filter cake, a proppant, a dirt layer, a rock layer, a caprock, an overburden, a casing element, a centralizer, a cement sheath, a cement layer, and/or the like.

Mud filter cake broadly refers to the residue or remainder deposited or laid down on a permeable medium or semi-permeable medium when a slurry or solution, such as a drilling mud, is forced against the medium under a pressure. Filtrate is the liquid that passes through the medium, leaving the cake on the medium. Suitable drilling muds can be water-based or oil-based fluids and can include adequate filtration rate and filter-cake properties. Drilling muds can be biodegradable. Mud filter cake properties can include any suitable attribute, such as cake thickness, toughness, slickness, permeability, and/or the like. Mud filter cakes may isolate formations from drilling mud, such as in high-angle holes, horizontal holes, vertical holes, and/or the like.

Proppant broadly refers to sized particles mixed with fracturing fluid to hold fractures open after a hydraulic fracturing treatment and/or the like. Proppant may include any suitable material, such as sand grains resin-coated sand, high-strength ceramics, sintered bauxite, and/or the like. Proppant materials may be sorted for size and/or sphericity, such as to provide an efficient conduit for production of fluid to or from the reservoir to the wellbore.

Cement sheath or cement barrier broadly refers to cement, or other suitable material such as mortar, concrete, and/or the like that is placed around the outside of the casing, such as to anchor the casing and/or provide additional containment.

Caprock broadly refers to a relatively impermeable rock or layer that forms a barrier or seal above and around reservoir and/or a reservoir rock so that fluids or gases cannot migrate beyond the reservoir. The caprock may be atop a salt dome and include any suitable material, such as shale, anhydrite, salt, and/or the like. There may be several caprock layers intersected and/or crossed by a given engineered wellbore.

The permeability of a caprock may include any suitable amount or value, such as between about $10^{-6}$ darcies to about $10^{-8}$ darcies.

Overburden broadly refers to rock or material overlying an area or point of interest in the subsurface.

According to one embodiment, the one or more sensors exclude data storage and power storage, such as to form a dumb sensor, as discussed above.

The sensors may include any suitable service life. Service life broadly refers to an expected lifetime, or the acceptable period of use in service. The sensors of this invention may include a service life of at least about 1 year, at least about 5 years, at least about 10 years, at least about 30 years, at least about 60 years, at least about 100 years, at least about 250 years, and/or the like.

According to one embodiment, this invention may include a method for monitoring integrity of a borehole suitable for sequestration of greenhouse gases. The method may include the step of disposing one or more sensors outside a casing, and the step of powering the one or more sensors with a tool inside the casing. The method may also include the step of interrogating the one or more sensors with the tool to monitor a borehole.

Disposing broadly refers to placing, emplacing, mounting, locating, affixing, and/or the like. Outside the casing broadly refers to any portion or space that is not the inside of the casing. Generally, outside the casing refers to outside the pipe wall. Outside the casing may include in the dirt, in the rock, in the caprock, in the mud filter cake, in the proppant, in the cement sheath, and/or the like. The step of disposing the sensors may include any suitable action, such as placement by a logging tool, placement during circulation of drilling mud, placement during installation of proppant, placement during cementing, placement by a distributing device inserted into an empty borehole and/or the like.

The sensors used in the method broadly may include any and/or all the features and characteristics described above.

Powering broadly refers to the step or act of supplying or providing power and/or energy, such as to a passive sensor. The tool used in the method broadly may include any and/or all of the features and characteristics described above.

Interrogating broadly refers to asking or querying and may include one-way communication and/or two-way communication.

The method may also include the step of measuring or detecting pH, porosity, conductivity, resistivity, presence or migration of carbon dioxide or hydrocarbon liquid or hydrocarbon gas, and/or the like with the one or more sensors. Measuring broadly refers to any suitable action or step by the sensor to determine a characteristic or change in characteristic of the surroundings of the sensor. Measuring generally includes some amount or degree of quantification, such as a pH of 6 or a concentration of carbon dioxide of 5 parts per million atomic.

Detecting broadly refers to discovering or determining the existence, presence, or fact of a characteristic. Detecting generally includes a more qualitative process, such as the presence or migration of hydrocarbon.

According to one embodiment, the step of disposing the one or more sensors may include placement of the one or more sensors on a centralizer, other external attachment, in the mud filter cake, in the proppant, or in the cement in or along a caprock or other non-productive interval.

According to one embodiment, the step of disposing the one or more sensors may include circulating the one or more sensors in drilling mud and embedding the one or more sensors in a mud filter cake. Circulating broadly refers to the sensors being added to the drilling mud or other fluid at the surface and pumped downhole for deployment.

According to one embodiment, the step of disposing the one or more sensors may include placement in the mud filter cake, proppant, cement, cement sheath, and/or the like along a caprock or other non-productive or low permeability interval. Non-productive or low permeability interval broadly refers to a formation that does not bear or produce oil or natural gas and/or may prevent migration through it.

According to one embodiment, the step of powering the one or more sensors may include the use of electric induction field, nuclear energy, acoustic energy, radio frequency energy, and/or the like.

According to one embodiment, the step of interrogating the one or more sensors may include the tool sending a radio frequency signal and the one or more sensors transmitting a radio frequency signal.

According to one embodiment, the method may also include the step of determining a depth and an azimuth of the one or more sensors with respect to the borehole.

According to one embodiment, the method may include the step of monitoring an engineered borehole or components of the borehole. Components of the borehole may include a mud filter cake, cement, a casing, a centralizer, and/or the like. Optionally and/or additionally, the method may also include the step of monitoring a naturally occurring caprock or sequestration formation.

According to one embodiment, this invention may include a method of sequestration of greenhouse gases. The method may include the step of drilling a borehole and the step of disposing one or more sensors with respect to the borehole. The method may also include the step of casing the borehole with the one or more sensors outside a casing, and optionally the step of filling an annulus with cement. The method may also include the step of injecting a greenhouse gas into and/or through the borehole, and then into the surrounding geologic formations or storage formations. The method may also include the step of monitoring the integrity of the borehole by powering and interrogating the one or more sensors with a tool movable inside the casing. Desirably, the measurements obtained from the sensors indicate changes in the condition of the caprock and/or the presence or migration of fluids and/or gases along the barrier system and/or the caprock formation.

The step of injecting the greenhouse gas may include compressing and flowing carbon dioxide and/or other gases down the borehole, such as into a reservoir or geological formation. The carbon dioxide or other greenhouse gases may be collected at any suitable source, such as a coal fired electricity generating plant. Desirably, the injecting also includes actions to keep the greenhouse gas in the reservoir, such as capping or sealing the casing and/or the borehole near or on the surface at the end of the injection life for that engineered borehole. Injecting may include any of the other greenhouse gases discussed above.

According to one embodiment, the step of disposing the one or more sensors may include circulating drilling mud down the borehole, forming a mud filter cake, and embedding one or more sensors in the mud filter cake. The step of embedding the sensor in the mud filter cake may occur as the mud forms the mud filter cake by passing into a portion of a permeable formation, such as the caprock or in an existing natural fracture of the formation. The sensors can circulate with the mud and become part of the mud filter cake and/or embed against or into the formation.

Similarly, the sensors circulating in the moving cement become embedded or incorporated in the cement sheath when forming.

According to one embodiment, the step of disposing the one or more sensors may include locating on a centralizer or other external casing attachment, as discussed above.

According to one embodiment, the step of monitoring the integrity of the engineered borehole and the natural caprock seal may include measuring or detecting pH, porosity, conductivity, resistivity, presence or migration of carbon dioxide or hydrocarbon or hydrocarbon gas, and/or the like, as discussed above. Optionally and/or alternatively, the monitoring may include the naturally occurring portion of the system.

According to one embodiment, this invention may include a method of installing sensors outside an existing borehole or into a caprock suitable for sequestration of greenhouse gases. The method may include the step of lowering an installation tool into a borehole, and the step of making a hole through the casing, such as with the installation tool. The method may also include the step of placing one or more sensors inside the hole, and the step of optionally sealing the hole, such as with cement, epoxy, and/or other suitable material. Optionally and/or alternatively, the hole extends into or through a cement liner, a mud filter cake, or a caprock. For making the hole, the installation tool may use drilling, boring, explosives, and/or the like. A bit or rod containing a sensor may be deployed through the casing and/or cement with a self-sealing end or plug. The rod may be placed at any suitable angle, such as perpendicular to the casing and/or at an angle along the casing. Desirably, the rod can be made from a material harder than the casing, cement, and/or formation that it is deployed into. Another technique utilizes perforation, such as shaped charges. The perforation can be follow by squeezing or circulation, such as by cement with the sensors. The hole may include any suitable shape, such as a generally conical shape extending from the casing to a vertex. Desirably, the hole may contain one or more sensors.

EXAMPLE

A surface hole is drilled below ground level with a conventional drilling rig having drill pipe (drillstring) and a bit. Drilling fluid or drilling mud is circulated or pumped down the drillstring and up or out the hole by the annular space between the drillstring and the wall of the borehole, such that a mud filter cake remains in and/or on the borehole wall. The sensors are added to the drilling fluid and travel in it to the bottom of the hole, up the annular space, and then become embedded into the mud filter cake. The mud filter cake remains in the borehole.

A surface casing is set and cemented into place, such that the sensors in the mud filter cake remain. Additional sensors are circulated with the cement and become embedded into the cement. Sensors are thus embedded into the mud filter cake and the cement.

An intermediate borehole is drilled through the surface hole, such as having about a 31 centimeter diameter. The sensors are circulated in the mud during drilling and embed into the mud filter cake at a lower depth than before. The mud filter cake remains in the borehole.

An intermediate casing is set and cemented, such as about a 24.5 centimeter diameter pipe of carbon steel or corrosion resistant material. Circulation of cement occurs after landing the casing. Cement is pumped into the casing and up the hole (by the annular space) along the outside of the casing. The sensors remain in the mud filter cake and additional sensors are circulated with the cement and become embedded in the cement.

A drill injection interval is drilled through the intermediate borehole, such as about a 21.5 centimeter hole. The drilling mud is circulated as above and the sensors embed into the mud filter cake at a lower depth. The mud filter cake remains in the borehole.

An injection casing is set and cemented, such as about a 17.75 centimeter diameter pipe. The sensors remain in the mud filter cake and additional sensors are circulated with the cement and become embedded in the cement.

When casing centralizers are used on any of the casings (surface, intermediate, injection), sensors are mounted to the outside of the centralizer before insertion, such as the sensors are mounted on an edge of the expansion mechanism and/or in the bow.

The sensors are remotely powered by a logging device or tool to read or interrogate the sensors. The logging device is on a wireline and passes through the wellhead seals. The sensors are near the surface, at depth, in the caprock, and in the formation. The logging device interrogates the sensors on descent and/or ascent or at periodic intervals when the logging device may be stopped in the well for this purpose.

Additional sensors are deployed as needed by using a drill, explosives, hydraulic jet, and/or the like to punch through or penetrate the casing and create an aperture or hole for the sensor to be placed in. The sensor is placed in the aperture and the aperture closed or plugged if needed.

As used herein the terms "having", "comprising", and "including" are open and inclusive expressions. Alternately, the term "consisting" is a closed and exclusive expression. Should any ambiguity exist in construing any term in the claims or the specification, the intent of the drafter is toward open and inclusive expressions.

Regarding an order, number, sequence and/or limit of repetition for steps in a method or process, the drafter intends no implied order, number, sequence and/or limit of repetition for the steps to the scope of the invention, unless explicitly provided.

It will be apparent to those skilled in the art that various modifications and variations can be made in the disclosed structures and methods without departing from the scope or spirit of the invention. Particularly, descriptions of any one embodiment can be freely combined with descriptions or other embodiments to result in combinations and/or variations of two or more elements or limitations. Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A method of sequestration of greenhouse gases, the method comprising:
   drilling a borehole through a caprock and into a formation beneath the caprock;
   distributing a plurality of neutrally buoyant sensors within mud filter cake around the borehole;
   casing the borehole with the sensors outside of the casing;
   filling an annulus with cement, the cement comprising a plurality of distributed neutrally buoyant sensors;
   injecting a greenhouse gas into the formation; and
   monitoring an integrity of the borehole by powering and interrogating the sensors with a wireline tool movable inside the casing.

2. The method of claim 1, wherein the sensors measure or detect geomechanical properties, geochemical properties, porosity, permeability, conductivity, presence or migration of carbon dioxide or hydrocarbon(s).

3. The method of claim 1, wherein the sensors exclude data storage and power storage.

4. The method of claim 1, wherein the sensors have a service life of at least 30 years.

5. The method of claim 1, wherein the distributing a plurality of sensors comprises placement in or along a caprock or other non-productive interval.

6. The method of claim 1, the method further comprising:
   powering the plurality of sensors by acoustic energy, radio frequency energy, or electrical induction.

7. The method of claim 1, wherein the interrogating the plurality of sensors comprises the wireline tool sending a radio frequency signal and the sensors transmitting a radio frequency signal.

8. The method of claim 1, the method further comprising:
   determining a depth and an azimuth of the sensors with respect to the borehole.

9. The method of claim 1, wherein distributing the sensors comprises:
   circulating drilling mud down the borehole;
   forming a mud filter cake; and
   embedding sensors in the mud filter cake.

10. The method of claim 1, further comprising locating a plurality of sensors on a centralizer.

11. The method of claim 1, wherein monitoring the integrity of the borehole comprises measuring or detecting pH, carbon dioxide, hydrocarbon, or conductivity.

\* \* \* \* \*